United States Patent
Kvinge et al.

(10) Patent No.: US 9,201,637 B1
(45) Date of Patent: Dec. 1, 2015

(54) MANAGING GENERIC OBJECTS ACROSS MULTIPLE RUNTIME ENVIRONMENTS

(71) Applicant: Xamarin Inc., San Francisco, CA (US)

(72) Inventors: Rolf Bjarne Kvinge, Madrid (ES); Sebastien Pouliot, Quebec (CA); Miguel de Icaza, Boston, MA (US)

(73) Assignee: Xamarin Inc., San Francisco, CA (US)

( * ) Notice: Subject to any disclaimer, the term of this patent is extended or adjusted under 35 U.S.C. 154(b) by 0 days.

(21) Appl. No.: 14/670,218

(22) Filed: Mar. 26, 2015

(51) Int. Cl.
*G06F 9/44* (2006.01)
*G06F 9/445* (2006.01)
*G06F 9/45* (2006.01)
*G06F 9/455* (2006.01)

(52) U.S. Cl.
CPC *G06F 8/437* (2013.01); *G06F 8/36* (2013.01); *G06F 9/45508* (2013.01)

(58) Field of Classification Search
CPC ......... G06F 17/3089; G06F 8/10; G06F 8/61; G06F 21/6209; G06F 8/437; G06F 8/36; G06F 9/45508
See application file for complete search history.

(56) References Cited

U.S. PATENT DOCUMENTS

| | | | |
|---|---|---|---|
| 5,280,617 A | 1/1994 | Brender et al. | |
| 5,493,675 A | 2/1996 | Faiman et al. | |
| 6,389,590 B1 | 5/2002 | Miller et al. | |
| 6,789,254 B2 * | 9/2004 | Broussard | G06F 9/54 717/108 |
| 6,865,733 B2 * | 3/2005 | Broussard | G06F 8/36 717/146 |
| 8,006,239 B2 | 8/2011 | Sankaranarayanan et al. | |
| 8,245,210 B2 | 8/2012 | Ng et al. | |
| 8,640,093 B1 * | 1/2014 | Gill | G06Q 30/02 717/120 |
| 8,683,462 B2 * | 3/2014 | Goldman | G06F 9/445 717/124 |
| 9,027,004 B1 * | 5/2015 | Johnson | G06F 8/41 717/140 |
| 2003/0093780 A1 | 5/2003 | Freudenberger et al. | |
| 2003/0126590 A1 | 7/2003 | Burrows et al. | |
| 2005/0132328 A1 | 6/2005 | Bulusu | |
| 2008/0320453 A1 * | 12/2008 | Meijer et al. | 717/140 |
| 2010/0287536 A1 | 11/2010 | Chung et al. | |
| 2012/0304044 A1 * | 11/2012 | Leithead | G06F 9/541 715/205 |

OTHER PUBLICATIONS

Charland et al., Mobile Application Development: Web vs. Native, Apr. 2011, 9 pages.*
Jazayeri et al., End-user programming of web-native interactive applications, Jun. 2011, 6 pages.*
Office Communication for U.S. Appl. No. 14/337,064 mailed on Sep. 9. 2014.

(Continued)

*Primary Examiner* — Thuy Dao

(74) *Attorney, Agent, or Firm* — John W. Branch; Lowe Graham Jones PLLC

(57) ABSTRACT

Embodiments are directed towards managing generic objects across multiple runtime environments. If a generic type definition is encountered during compilation of an application it may be determined if the encountered generic type has interactions with the native runtime environment. Native runtime signatures that may be arranged to enable native objects to execute the generic type methods may be generated for each generic type methods that interact with the native runtime. Binding layer machine code may be generated to map each native runtime signature to a corresponding generic type method. And, in at least one of the various embodiments, the binding layer machine code may be inserted into the machine code version of the application.

27 Claims, 11 Drawing Sheets

(56) References Cited

OTHER PUBLICATIONS

Achten. P. et al., "When generic functions use dynamic values," 2002 Proceedings of the 14th International Conference on Implementation of Functional Language, Lecture Notes in Computer Science, (2003) pp. 17-33.

Office Communication for U.S. Appl. No. 14/337,064 mailed on Feb. 23, 2015.

Office Communication for U.S. Appl. No. 14/337,064 mailed on May 12, 2015.

Office Communication for U.S. Appl. No. 14/537,298 mailed on Feb. 25, 2015.

* cited by examiner

MANAGING GENERIC OBJECTS ACROSS MULTIPLE RUNTIME ENVIRONMENTS

TECHNICAL FIELD

This invention relates generally to software application development, and more particularly, but not exclusively, to managing generic objects across multiple runtime environments.

BACKGROUND

A highly competitive application marketplace and the consumerization of information technology have put tremendous pressure on application developers to deliver high quality user experiences for both consumers and employees on numerous and varied target platforms. Accordingly, it may be advantageous to employ modern cross-platform software development tools to enable application developers to develop applications that target more than one platform. Further, modern programming languages may include features that allow for efficient and safer programming of applications. Some of the modern programming languages may enable application developers to employ features such as generic programming for applications that are executing on the target platform. However, in some cases, some target platform may be incompatible or otherwise interoperate poorly with the generic programming features of the supported by the cross-platform software development tools. In some cases, some target platforms may not support generic programming. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DETAILED DESCRIPTION OF THE VARIOUS EMBODIMENTS

Figure 1:
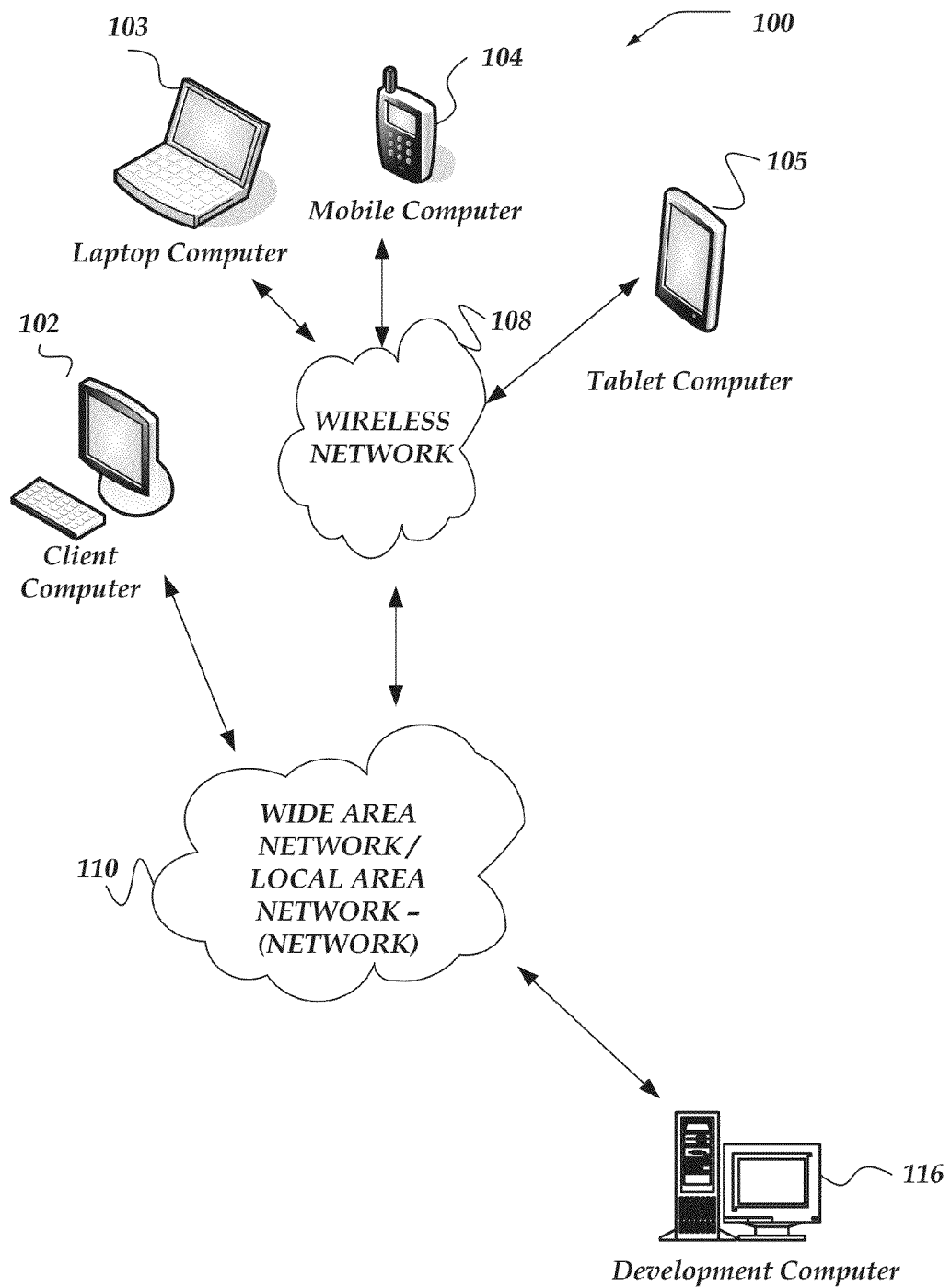
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "application" as used herein refers to a computing/software application designed to operate on one of more target computers/platforms. One of ordinary skill in art the will appreciate that many type of applications may benefit from these innovations and are within the scope and spirit of the disclosed innovations, including, but not limited to, desktop applications, video games, mobile applications, media players, office applications, utilities, or the like.

The term "application developer" as used herein refers to users that design and develop applications. Application developers may create and deploy applications for use on various target platforms.

The term "mobile computer" as used herein refers to client computers and may include tablet computers, handheld computers, wearable computers, desktop computers, or the like. Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, game consoles, integrated devices combining at least one of the preceding computers, or the like.

The terms "target platform," "target computer" as used herein refer to computers, such as, mobile computers, client computers, smart televisions, game consoles, set-top cable boxes (for televisions), smart home appliances, or the like, upon which applications are intended to be deployed. In at least one of the various embodiments, source code for an application may be compiled into machine code that is compatible for execution on one or more target computers. Different types of target computers may require compilers to generate machine code that is particular to the machine architecture of the particular target computers.

The term "runtime environment" as used herein may refer to applications/facilities that provide the executable environment that enable one or more applications to run on a target platform. In some embodiments, a runtime environment may comprise a virtual machine and one or more supporting libraries and/or subsystems. Also, runtime environments may be arranged to support more than one computer programming language. Examples, may include, Java Runtime Environment (JRE), Microsoft's, Common Language Runtime (CLR), or the like.

The term "managed code environment," or "managed runtime environment" as used herein refers to a runtime environment or a portion of a runtime environment where the runtime environment has control and visibility of the memory, threads, of execution, resources, or the like.

The term "unmanaged code environment," "unmanaged runtime environment," and "native code environment" as used herein refer to execution environments on the target platform where the managed runtime does not have as much control or visibility as it does within managed code environments. In some cases, unmanaged environments may be considered to be outside of the control of the managed runtime. Typically, unmanaged code environments are encountered if threads executing in a managed environment call or access native services or facilities on the target platform that are outside of the managed runtime, such as, user interface objects, networking services, file systems, system libraries, or the like, or combination thereof.

The terms "native environment," "native runtime," or "native runtime environment" as used herein refers to an unmanaged code environment as described above.

The term "native code call" as used herein refers to a function call that will be executed in the unmanaged code environment. In at least one of the various embodiments, a compiler may insert native code calls into an application if the application needs to access various native services or facilities provided by the target platform. For example, native code calls may include, user-interface access/display, file system access, network operations, interprocess communication, date/time functions, math functions, string processing functions, synchronization operations (e.g., locks, semaphores, mutexes, and so on), user interface functions, or the like.

The term "binding layer" as used herein refers portion of the managed runtime that is arranged to provide interoperation between the managed runtime environment and the native runtime environment. Interfaces and objects provided by the binding layer enable managed application executing in the managed runtime to inter-operate with objects and resources in the native runtime environment. In some embodiments, the implementation of the binding layer may comprise both managed runtime environment code/components and some native runtime environment code/components. In at least one of the various embodiments, these facilities may generally be considered extension facilities. For example, if the managed runtime is a Java VM, the Java Native Interface may be used to implement a binding layer that interfaces with a native runtime environment. Likewise, if for example, the managed runtime is a Python runtime, the Python Application Programmer's Interface (Python API) may be employed to interface with the native runtime environment. In some cases, application developers may implement custom extensions that enable a binding layer between the managed runtime environment and the native runtime environment.

The term "peer object" as used herein refers to an object or resource that exists both in the managed runtime environment and the native runtime environment.

The terms "managed peer object," or "managed peer" as used herein refer to a managed object that corresponds to a native object.

The terms "native peer," or "native peer object" as used herein refer to the native runtime environment portion of a peer object.

The terms "framework peer," or "framework peer object" as used herein refer to a managed peer that represents a framework (system) object of the native runtime environment. For example, framework peers may be objects that represent user interface elements that are provided by the native runtime environment.

The terms "user peer," or "user peer object" as used herein refers to a managed peer object used in the managed runtime environment that derives from a framework peer.

The term "generic function" as used herein refers to functions programmed using generic programming techniques. Generic functions are a well-known in computer science. Generic functions, and generic programming in general, enables common sets of source code instructions to be applied using different parameter data types and/or return values by abstracting the parameter types of the functions. Accordingly, generic functions are functions that are defined without reference to specific parameter types. Typically, a type placeholder symbol, such as, 'T' may be inserted in the generic function definition representing the parameter types in a function. If an application programmer uses a generic function, he or she will supply one or more particular parameter data in the source code. The particular parameter type may be resolved during execution of the application or during compilation of the application into machine code.

In addition to generic functions, computer programming languages that support generic programming may provide other generic entities, such as, generic classes, generic collections, generic methods, or the like. For brevity and clarity, the term "generic function" as used herein is intended to represent each of the other generic programming entities.

The term "parameter" as used herein refers to a variable and/or variable name that is included either explicitly or implicitly in the definition of a function. The precise syntax of parameters will vary depending on the particular programming language that is being employed. In at least one of the various embodiments, the parameters defined for a function may be employed by a compiler to generate an identifier and/or signature for the particular function. Accordingly, in some programming languages, function having the same name may be distinguishable because they are defined using different parameters.

The term "generic type" as used herein refers to a data type (e.g., a class) definition that employ generic programming principles. The generic type may be considered template for defining specific types based on one or more specified actual data types. Accordingly, in the source code of an application, one or more actual data types are used with define types that use the template defined by the generic type.

The term "open generic type" as used herein refers to generic type that is not yet fixed to one or more actual data types.

The term "closed generic type" as used herein refers to a generic type that is fixed to one or more actual data types. Open generic types may be considered the definition of the template for the generic type. Closed generic types may be considered a specific generic type based on one or more actual data types.

The term "return value" as used herein refers to a variable that is passed out of function (e.g., returned) after it runs to completion. Note, depending on the programming language, return values for functions may be optional.

The term "parameter type" as used herein refers to the type of data type represented by a defined parameter. In at least one of the various embodiments, parameters are often defined to represent a specific/particular data type. Accordingly, a compiler may be arranged to confirm source code whether arguments having the correct/specified argument types are passed as arguments to functions. In generic programming, one or more parameter types may be passed to as arguments to generic functions. During runtime and/or compilation of the application source code, the parameter type arguments may be determined enabling the runtime environment and/or the compiler to generate a type specific machine code version of the generic function.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing generic objects across multiple runtime environments. In at least one of the various embodiments, one or more applications may be generated from source code. In at least one of the various embodiments, if a generic type definition may be encountered during the compilation an application source code into a machine code additional actions may be performed.

In at least one of the various embodiments, if the encountered generic type may be determined to have one or more interactions with the native runtime environment hosting the managed runtime environment, still further action may be taken. In at least one of the various embodiments, determining the interactions with the native runtime environment may include determining one or more features of a native object type that may be inherited by the encountered generic type. Also, in at least one of the various embodiments, determining the interactions with the native runtime environment may include determining one or more generic type methods that include parameters that are native object types, one or more generic type methods that return values that are native object types, or the like.

In at least one of the various embodiments, interactions with the native runtime environment may include, communicating user input, displaying user interfaces, network communication, file system access, audio generation, or the like, or combination thereof.

In at least one of the various embodiments, the interactions with the native runtime environment may be determined to be compatible with the encountered generic type based on the native objects that are referenced by the encountered generic type.

In at least one of the various embodiments, one or more generic type methods that are part of the encountered generic type that may interact with the native runtime environment may be determined.

Accordingly, in at least one of the various embodiments, native runtime signatures may be generated for each of the determined generic type methods, such that the native runtime signatures may be arranged to enable one or more native objects in the native runtime environment to execute the generic type methods in the managed runtime environment. In at least one of the various embodiments, generating the native runtime signatures may include, generating native runtime signature information that includes at least binding layer machine code that may be used to convert one or more managed parameter types to one or more native parameter types.

In at least one of the various embodiments, binding layer machine code may be generated that maps each native runtime signature to a corresponding generic type method. In at least one of the various embodiments, generating the binding layer machine code may include generating machine code that may enable one or more managed generic type objects to execute one or more native object methods in the native runtime environment. And, in at least one of the various embodiments, the binding layer machine code may be inserted into the machine code version of the application.

In at least one of the various embodiments, if a native object in the native runtime environment calls a generic object method in the managed runtime environment an identifier of a managed object that corresponds to the generic object method may be determined, such that the identifier may be provided to the managed runtime environment by the native runtime environment. And, a generic type that defines one or more actions of the generic object method may be determined based on the managed object that may correspond to the identifier.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Development Computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or fewer client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Development Computer 116, or other computers.

Client computers 102-105 may further be configured to include a client application that enables an end-user to log into an end-user account that may be managed by another computer, such as Development Computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, Development Computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Development Computer 116 is described in more detail below in conjunction with FIG. 3. Briefly, however, Development Computer 116 includes virtually any network computer capable of performing actions for generating software applications for a client computer.

Although FIG. 1 illustrates Development Computer 116 as a single computer, the innovations and/or embodiments are not so limited. For example, one or more functions of Development Computer 116 may be distributed across one or more distinct network computers. Moreover, Development Computer 116 is not limited to a particular configuration such as the one shown in FIG. 1. Thus, in one embodiment, Development Computer 116 may be implemented using a plurality of network computers and/or client computer. In other embodiments, development computer may operate as a plurality of network computers within a cluster architecture, a peer-to-peer architecture, or the like. Further, in at least one of the various embodiments, Development Computer 116 may be implemented using one or more cloud instances in one or more cloud networks.

Illustrative Client Computer

Figure 2:
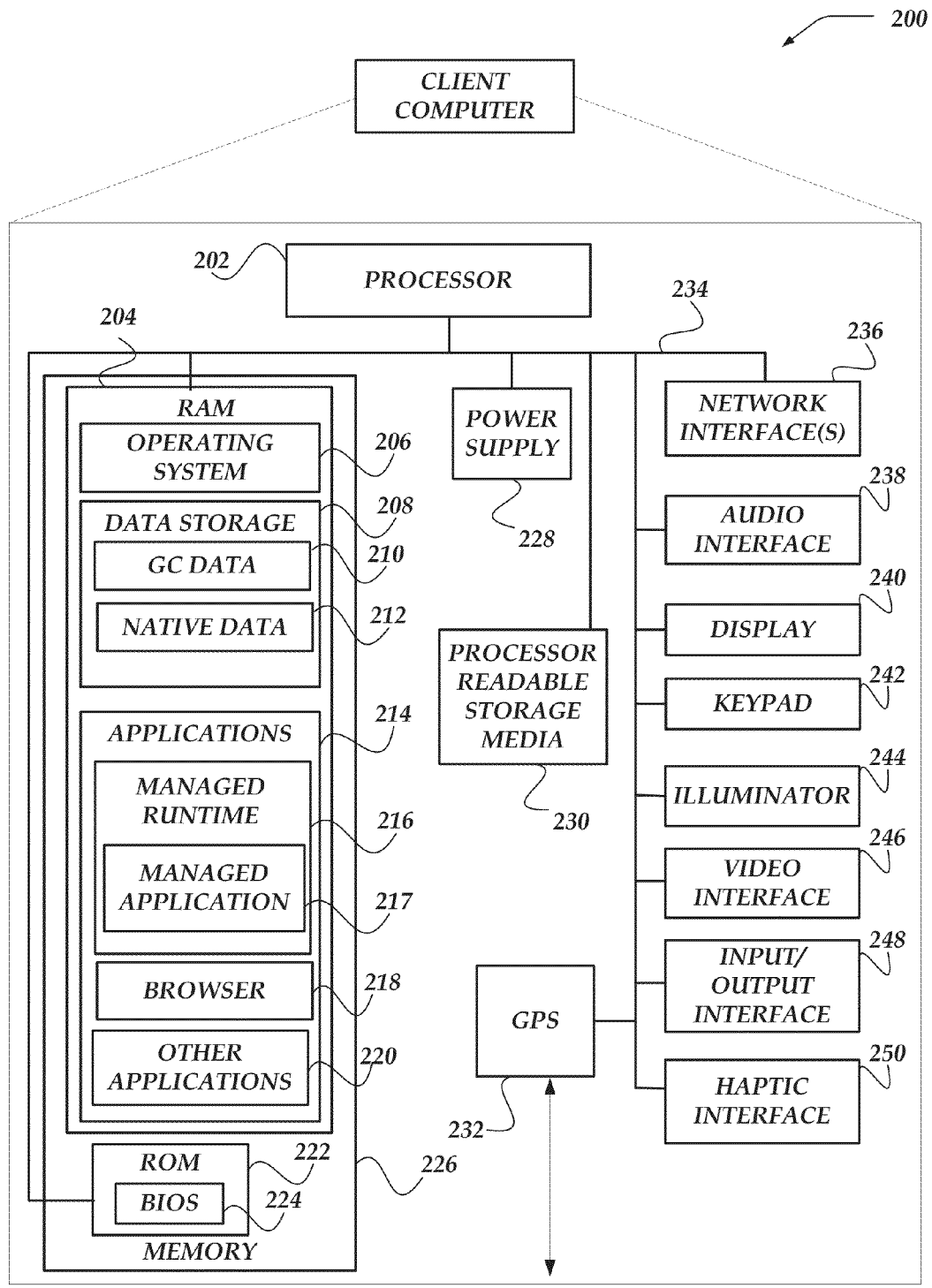
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/realtime transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content. In at least one of the various embodiments, a portion of data storage 208 may be arranged to store garbage collection data (GC data) 210 for storing memory object and object information related to garbage collection. Also, in at least one of the various embodiments, a portion of data storage 208 may be arranged to store native data 212 for memory objects that may be managed by a native memory management system.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or a computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220.

Further, applications 214 may include one or more managed runtime environments, such as managed runtime 216. Also, one or more managed applications, such as, managed application 217 may be hosted by managed runtime 216. Likewise, other application 220 may include one or more native applications that are running in the native environment provided by operating system 206.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Development Computer 116 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
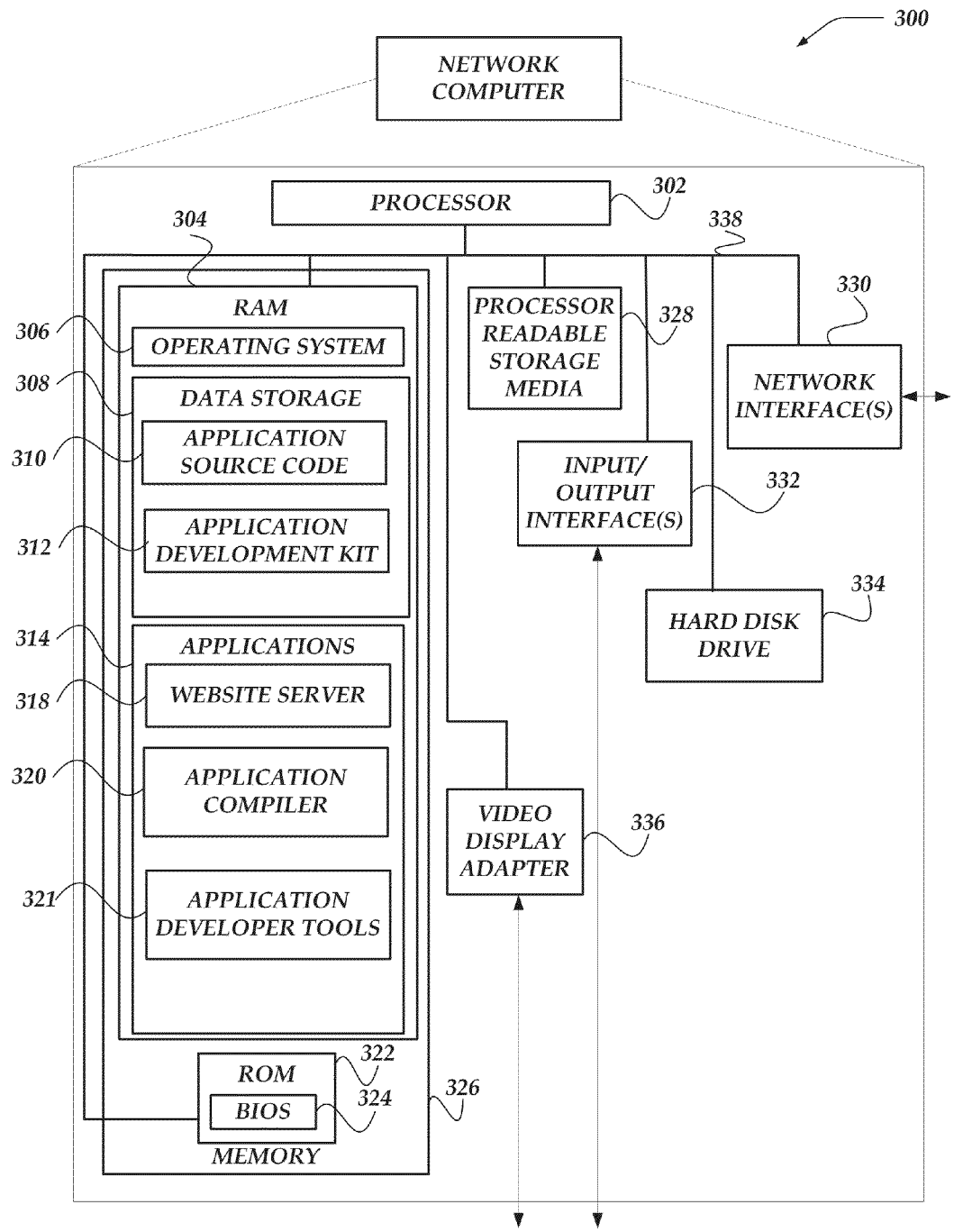
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example Development Computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/ output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include application source code 310. In at least one of the various embodiments, application source code 310 may include information, such as, one or more files, resources, projects, or the like, used for generating executable application. Also, in at least one of the various embodiments, data storage 308 may include, one or more of application development kit 312 representing information and/or tools for generating executable applications, including managed applications, targeted for one or more target platforms.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, application compiler 320 for performing actions for generating executable applications, including managed applications, for one or more target platforms. Also, Applications 3145 may include application developer tools 321 that enable application developer to develop applications.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical System Architecture

Figure 4:
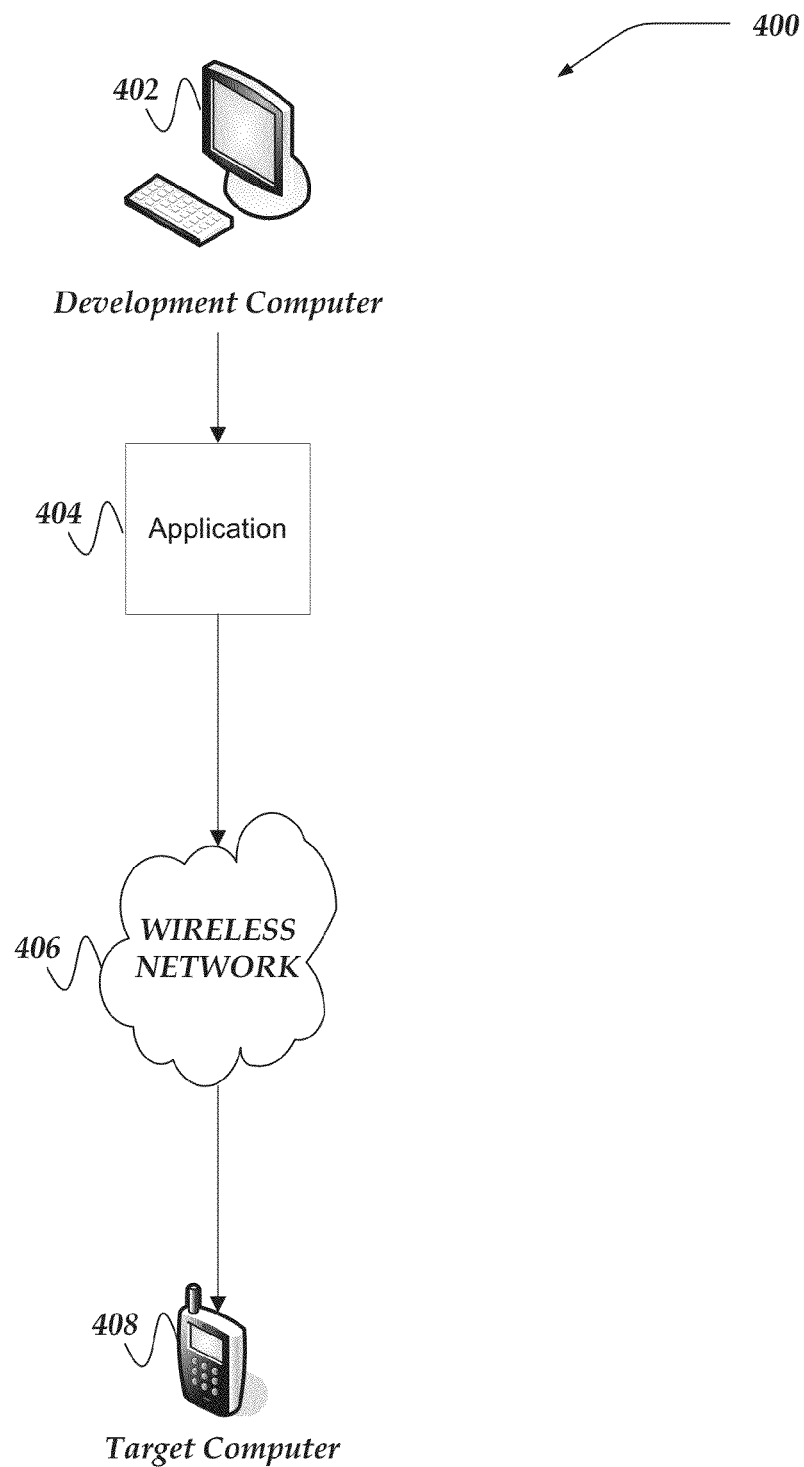
FIG. 4 illustrates a system for generating applications that may employ and manage generic objects across multiple runtime environments, in accordance with at least one of the various embodiments.

FIG. 4 illustrates system 400 for generating applications that may employ and manage generic objects across multiple runtime environments, in accordance with at least one of the various embodiments. In at least one of the various embodiments, system 400 comprises components for developing software applications targeted for one or more computers, such as, mobile computers, client computers, game consoles, set-top television boxes, smart televisions, media broadcasting appliances, or the like. In at least one of the various embodiments, system 400 may comprise one or more development computers, such as, development computer 402. In at least one of the various embodiments, development computer 402 may be a network computer or a client computer that is arranged to include tools and facilities that enable software programmers/application developers to create and generate applications for one or more target computers/devices. In at least one of the various embodiments, application developer tools 321 and/or application compiler 320 may be arranged to include one or more of the tools and facilities that enable software programmers to create and generate applications. For example, source code editors, compilers, linkers, software development kits, libraries, user interface design tools, or the like, or combination thereof.

In at least one of the various embodiments, application 404 represents a compiled software application that has been generated by a development computer, such as, development computer 402. In at least one of the various embodiments, for this example, application 404 may be considered to be a managed application, that is arranged execute in a managed runtime environment, such as, managed runtime 216.

In at least one of the various embodiments, often if an application is ready to be deployed to a target computer, it may be provided to the target computer over a network such as network 406. In at least one of the various embodiments, network 406 may be comprised of one or more networks, such as, network 110 or wireless network 108, or combination thereof.

In at least one of the various embodiments, target computer 408 represents one or more of the various kinds of computers that may be targeted by application 404. As discussed above, such computers may include, mobile computers, client computers, smart televisions, game consoles, set-top cable boxes (for televisions), smart home appliances, or the like.

In at least one of the various embodiments, target computer 408 may be provided application 404 over a network such as network 406. Also, in at least one of the various embodiments, target computer 408 may be provided application 404 using computer readable media, such as, USB thumb drives, memory cards, or the like. Also, for some embodiments, application 404 may be provided to an online application store and/or online application marketplace that enables one or more target computers to download and install the application over a network.

Figure 5A:
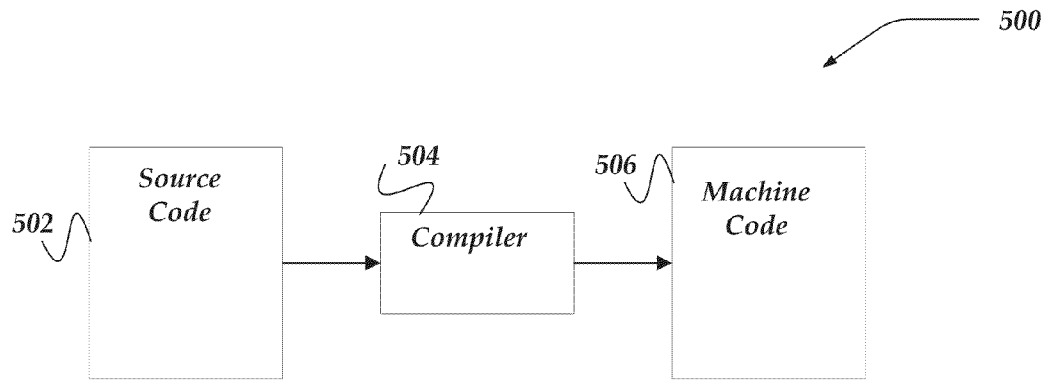
FIGS. 5A-5B illustrate logical diagrams of systems for generating applications that include facilities for managing generic object across multiple runtime environments.
Figure 5B:
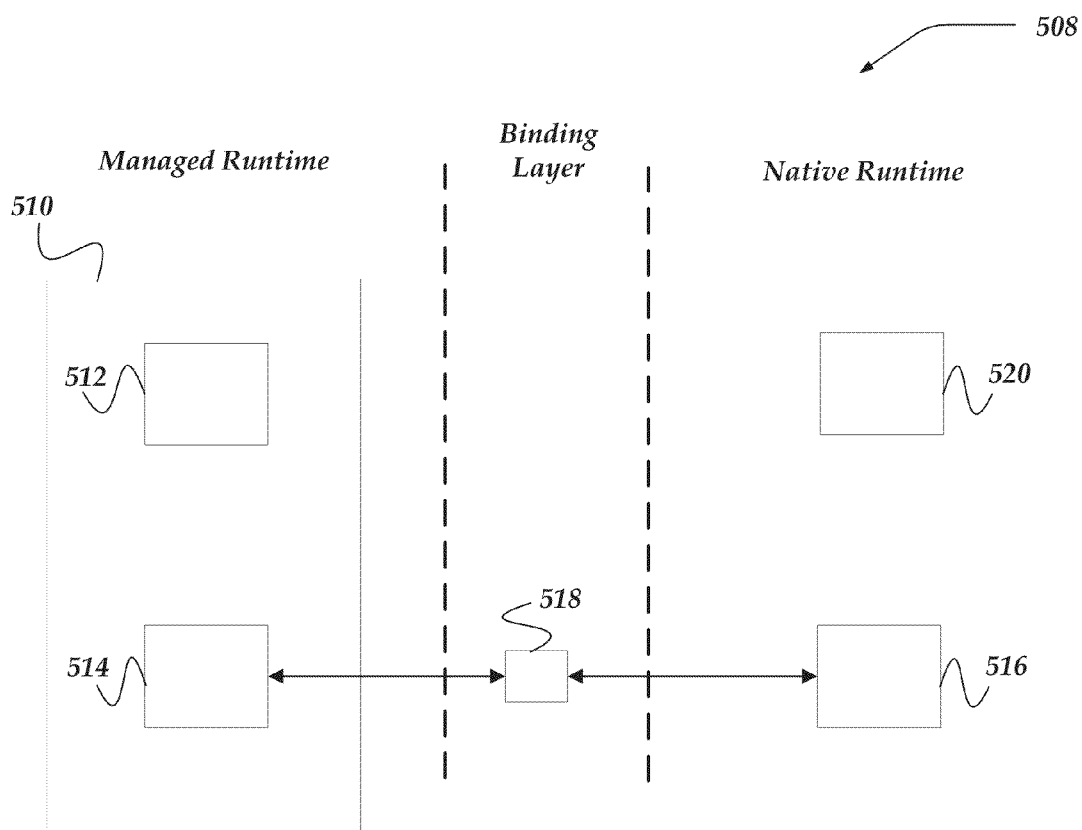

FIGS. 5A-5B illustrate logical diagrams of systems for generating applications that include facilities for managing generic objects across multiple runtime environments.

FIG. 5A shows a logical schematic for system 500 of generating machine code from a source code file using one or more software development applications/tools, such as a compiler, in accordance with at least one of the various embodiments. In at least one of the various embodiments, source code 502 may represent one or more files, documents, or resources, for a software application or one or more portions of a software application. In at least one of the various embodiments, source code 502 may include one or more files of human readable/editable source code composed in one or more computer programming languages. Source code 502 may include instructions for performing one or more specific actions (a computer program) on a processor device, such as, processor 202, processor 302, or the like. In at least one of the various embodiments, compiler 504 may represent one or more applications used for generating machine code 506 from provided source code, such as, source code 502. In at least one of the various embodiments, compiler 504 may be application compiler 320, application developer tools 321, or the like, or combination thereof. Accordingly, the actions performed by compiler 504 may comprise one or more distinct steps, such as, compiling, linking, resource building, application packaging, or the like, or combination thereof, depending the manage runtime environment, the managed application, and/or the native runtime environment, or the like. In the interest of brevity and clarity, all the steps necessary for generating an executable application may be referred to simply as compiling by a compiler.

In at least one of the various embodiments, machine code 506 may represent instructions that may be executed on a target computer. In at least one of the various embodiments, machine code 506 represents a collection of instructions and data for an application that may be installed and/or executed by a target computer. In at least one of the various embodiments, the instructions included in machine code 506 may include architecture/machine specific instructions for implementing/executing the instructions described in source code 502. Machine code targeted for target computers that have different machine/processor architectures may each represent the same source code instructions differently since they are based on instruction sets that may vary depending on the target computer's architecture. One of ordinary skill in the art will be familiar with the general process of compiling source code into machine code where the same source code may produce different machine code depending on the architecture of the target computers.

In at least one of the various embodiments, machine code 506 may be included an application that is targeted for execution in a managed runtime environment that may be hosted in a native runtime environment. Accordingly, in at least one of the various embodiments, compiler 504 may generate binding layer code that enables interoperation between the managed runtime environment and a native runtime environment that may be hosting the managed runtime environment.

FIG. 5B shows a logical representation of system 508 that includes two different runtime environments in accordance with at least one of the various embodiments. FIG. 5 represents a system (system 508) that may be arranged to include a native runtime environment and a managed runtime environment. In at least one of the various embodiments, application 510 represents a managed application that may be generated by a compiler, such as, compiler 504.

In at least one of the various embodiments, object 520 illustrates an object that may exist exclusively in the native runtime environment. Accordingly, object 520's memory and/or resources may be managed the native runtime. In at least one of the various embodiments, object 520 may be considered a native object because it may have no interaction with the managed runtime environment. It may be an object operating as part of the native runtime, providing native runtime services, or it may be part of a native application executing in the native runtime environment.

In at least one of the various embodiments, object 512 illustrates a managed object that may exist only in the managed runtime environment. In at least one of the various embodiments, object 512 may be allocated in the managed runtime environment. Accordingly, the native runtime environment may not have visibility of object 512. Accordingly, object 512 may be considered a managed object because the managed runtime environment may freely manage object 512 within the managed runtime environment. Also, in at least one of the various embodiments, object 512 may be considered a managed object because it may have no direct interaction with the native runtime environment. In at least one of the various embodiments, object 512 may be part of a managed application 510 executing in the managed runtime environment or it may be an object executing as part of the managed runtime environment.

In at least one of the various embodiments, object 514 may represent a managed object that may be part of managed application 510 that may be arranged to have one or more interactions with the native runtime environment. Likewise, in at least one of the various embodiments, native object 516 may be arranged to be a native object that is executing in the native runtime environment and it may have interactions with objects in and/or from the managed runtime environment.

In at least one of the various embodiments, since managed objects in the managed runtime environment and native objects in the native runtime environment normally exist/execute independently of each other and have no knowledge of each other, the binding layer may include binding code 518 that may be arranged to enable managed object 514 and native object 516 to interact with each other. In at least one of the various embodiments, there may be many managed objects that may be arranged to interact with native objects. In at least one of the various embodiments, the native runtime environment may provide various native services, such as, user-interfaces, networking, file systems, inter-process communication, or the like, that may be needed by one or more managed objects that may be part of a managed application.

In at least one of the various embodiments, a compiler may generate application and platform specific binding code 518 that enables managed objects and native objects to interact by calling functions/methods, exchanging parameters and return values, or the like, or combination thereof. Also, in at least one of the various embodiments, binding code, such as, binding code 518 may enable the managed runtime to accommodate one or more behavior differences and/or mismatches with the native runtime environment. For example, differences in how the native runtime environment passes parameter values may be accommodated by platform specific machine code comprising the binding layer.

In at least one of the various embodiments, managed objects that are paired with native objects may be referred to as managed peers. Likewise, native objects that are paired with managed objects may be referred to as native peers.

In at least one of the various embodiments, if a managed runtime environment supports generic programming, such as, generic types, it may need to accommodate one or more native runtime environments that do not natively support generic programming and/or generic types. Likewise, it may need to accommodate one or more native runtime environments that do not support generic programming and/or generic types by using semantics that may be different than those of the managed runtime environment.

Figure 6:
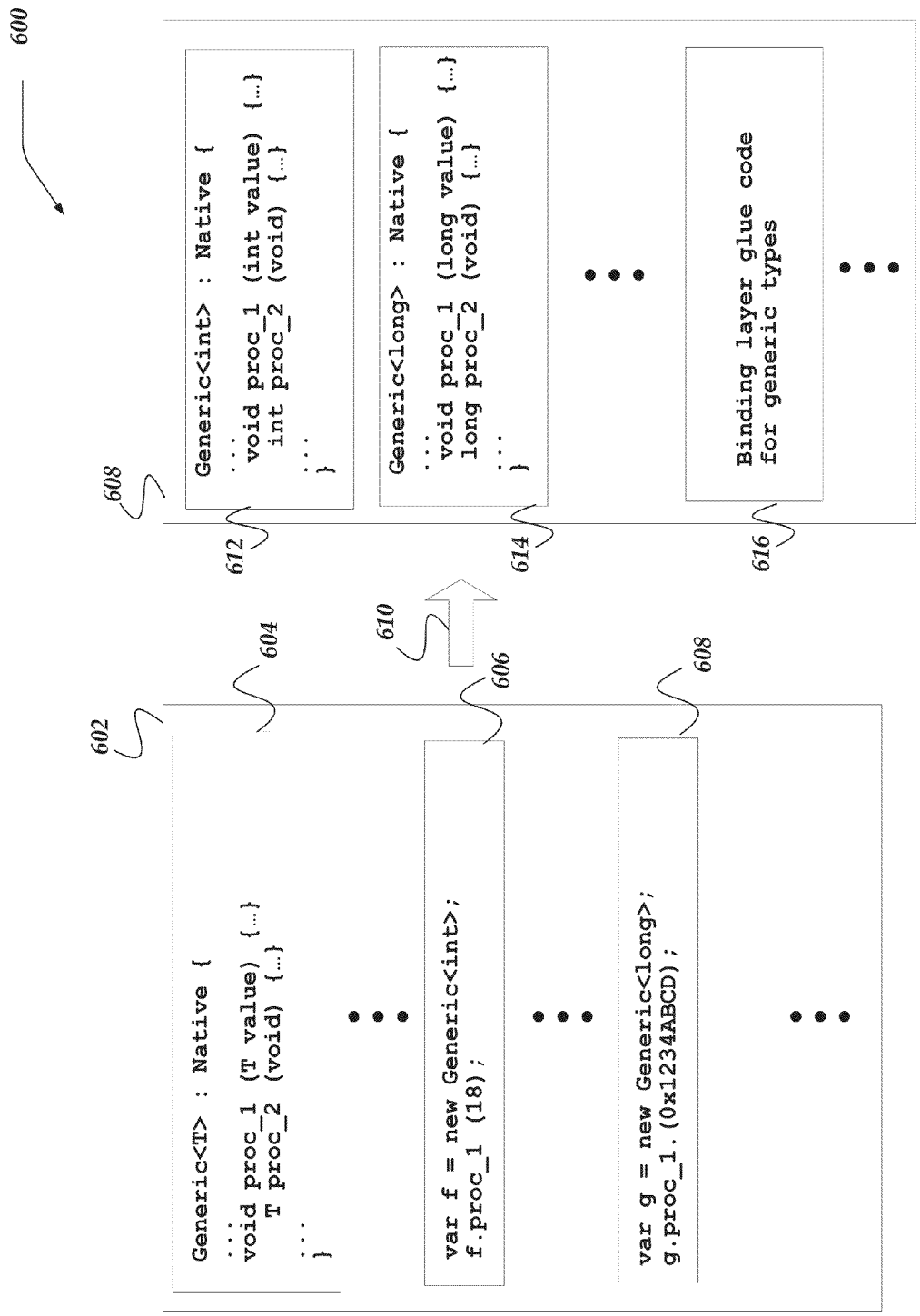
FIG. 6 illustrates a logical architecture of a system that includes generic types in accordance with at least one of the various embodiments.

FIG. 6 illustrates a logical architecture of system 600 that includes generic types in accordance with at least one of the various embodiments. In at least one of the various embodiments, source code 602 represents a portion of source code of a managed application that may be targeted for a managed runtime environment that supports generic types. One of ordinary skill in the art will appreciate the purpose, use, and advantages of generic types, and/or generic programming in general. Accordingly, the details of generic programming will not be discussed in detail. However, to provide clarity and context, generic types in a managed application will be briefly discussed with respect to the non-limiting example in FIG. 5. It is understood that various programming languages that support generic programming may include syntax and/or semantics different than described herein, but these examples, are at least sufficient to enable of one ordinary skill in the art to understand and/or practice the claimed innovations.

Accordingly, in at least one of the various embodiments, one or more generic types, such as, generic type 604 may be defined and/or included in source code 602. In at least one of the various embodiments, generic type 604 may be built-in generic type that may be provided in a header file (include file), library file, or the like, depending the platform being used. Or, in at least one of the various embodiments, it may be directly defined by an application programmer in the source code of the application.

As shown in this example, the notation Generic<T>: Native indicates that generic type 604 is an open generic type because it is not bound to a specific data type as indicated by the type placeholder T. Also, in this example, the notation indicates that generic type 602 inherits from native type Native. Thus, this may imply that instances of generic type 604 may have interactions with the native runtime environment. Also, in this example, generic type 606 is shown to include at least two methods, proc_1 and proc_2, each defined to use the placeholder type T. Briefly, it may be assumed that well-known object oriented programming semantics, such as, inheritance may be assumed. The specific details may vary between programming languages and platform, but one of ordinary skill in that art will appreciate that the notation used for generic type 602 shows that Generic<T> inherits some or all of the features of the native object type, Native.

As discussed for FIG. 5B, native objects and managed objects may be arranged to interact through the use of binding code in the bind layer of a managed application and/or managed runtime. Accordingly, one or more native objects may be exposed to the managed application and available to application developers to use in their programs. In this example, the type Native represents a native object that is exposed to the managed runtime. Likewise, one or more managed objects (managed peers) may expose methods and/or properties that may be called from or by the native runtime.

In this example, generic type 604 is an open type, thus the compiler may not generate any machine code for it since it has not been used. However, in this example, code block 606 shows a generic type being initialized and a method call. In code block 606, the open generic type 604 is used being to generate a closed generic type and an instantiated object of that type. Code block 606 also includes an example of a method proc_1 being called with a parameter type that matches the closed generic type. Likewise, in this example, code block 608, shows another closed generic type being created from generic type 606. Code block 608 also shows an example of calling a method on an instance of the new generic type.

In at least one of the various embodiments, as the compiler encounters code block 606 and code block 608 it may generate machine code for handling those specific generic types. In this example, block 608 may be assumed to be machine code produced by a compiler, however, for clarity and human readability the machine code is written as human readable source code.

In at least one of the various embodiments, code block 612 may be generated by a compiler in response to its first encounter in the source code of a code block like code block 606. Likewise, in this example, code block 614 may be generated by a compiler in response to encountering code block 608 during compilation of an application. In code block 612 and code block 614 the compiler has expanded the specific closed generic types that are needed as indicated by the source code. Accordingly, if the source code used other generic types, they would also be expanded. Also, note that in code block 612 and code block 614 the compiler has generated methods with parameter types and return value types that correspond to the type T that is used for each specific closed generic type.

Also, in at least one of the various embodiments, the compiler may generate code block 616 to include binding layer glue code for the generic types. This may be the binding code that enables interactions between the managed runtime environment and the native runtime environment. Note, if generic types defined in source code do not interact with the native runtime environment additional binding code for interfacing with the native runtime environment not generated. Though the compiler will still generate machine code to expand the generic types similar to code block 612 and/or code block 614 for use by the managed runtime environment to execute the managed application.

Further, in at least one of the various embodiments, the compiler may be arranged to perform various optimizations, such as, code sharing, byte packing, register allocation, in-lining, or the like, that are beyond the scope of this document and thus are not included herein. However, one of ordinary skill in the art will appreciate that the innovations described herein are envisaged to be integrated into state of the art compilers, and/or application development processes.

Generalized Operations

FIGS. 7-11 represent the generalized operations of employing and managing generic objects across multiple runtime environments in accordance with at least one of the various embodiments. In at least one of the various embodiments, processes 700, 800, 900, 1000, and 1100 described in conjunction with FIGS. 7-11 may be implemented by and/or executed on a single network computer, such as network computer 300 of FIG. 3. In other embodiments, these processes or portions of process thereof may be implemented by and/or executed on a plurality of network computers, such as network computer 300 of FIG. 3. Also, in at least one of the various embodiments, processes 700, 800, 900, 1000, and 1100 may be performed by a target computer, including, mobile computers, smart phones, client computers, smart televisions, game consoles, set-top cable boxes (for televisions), smart home appliances, or the like, such as, such as, client computer 200. Further, in at least one of the various embodiments, the processes described in conjunction with FIGS. 7-11 may be operative in architectures such as those described in conjunction with FIGS. 4-6.

Figure 7:
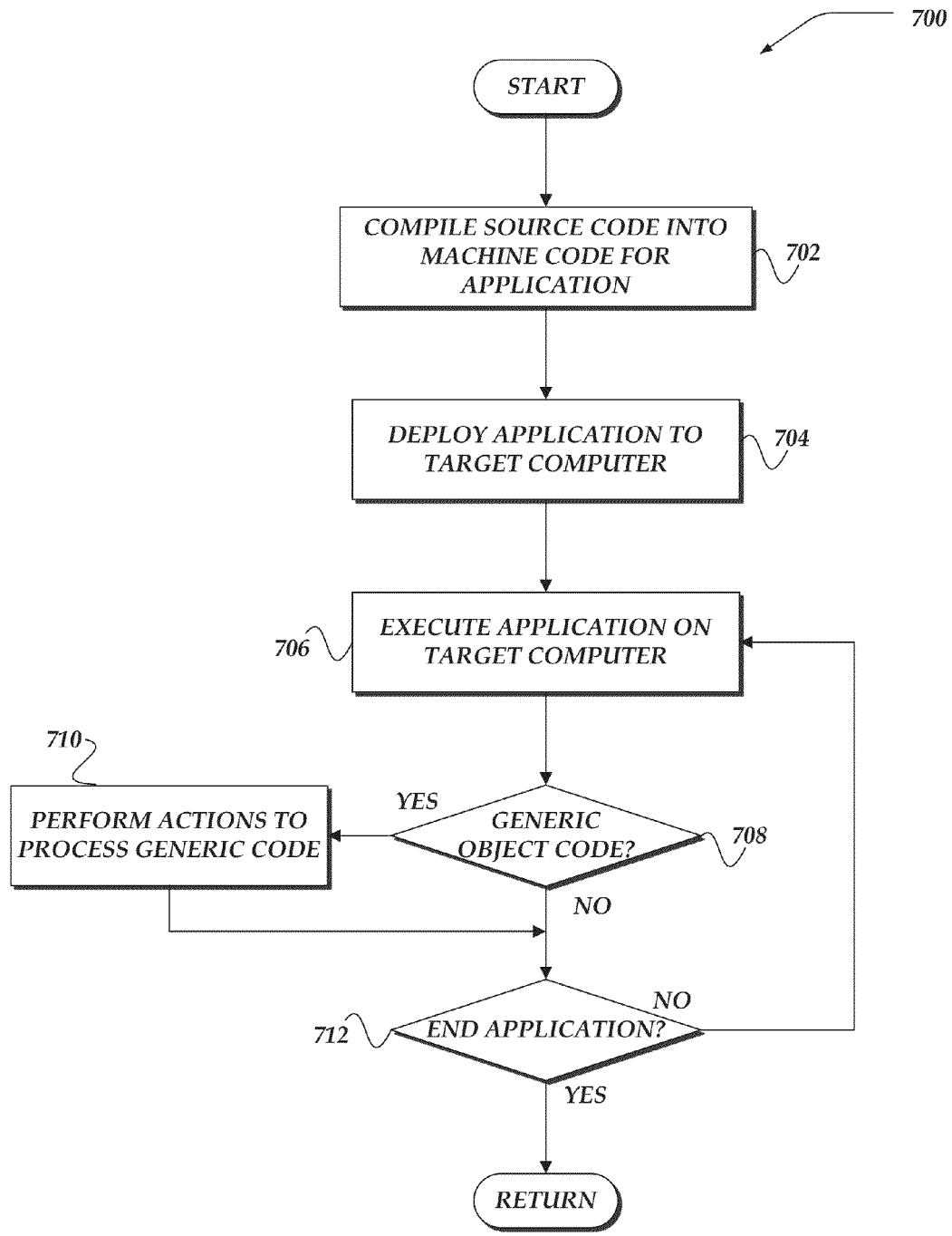
FIG. 7 shows an overview flowchart for a process for generating an application that may include generic types and/or generic objects in accordance with at least one of the various embodiments.

FIG. 7 shows an overview flowchart for process 700 for employing and managing generic objects across multiple runtime environments in accordance with at least one of the various embodiments. After a start block, at block 702, in at least one of the various embodiments, source code for an application may be compiled into machine code. In particular, a compiler may be employed to generate a machine code version of an application that is developed using a programming platform that support generic types.

At block 704, in at least one of the various embodiments, the compiled application may be deployed to a target computer, such as, as mobile computer, or other client computer. One or more well-known methods may be employed to deploy and install the compiled application on the appropriate target computer. For example, the application may be provided over a network to an application marketplace hosted in a networked and/or cloud environment. Accordingly, for this example, a user may select and download the application to their target computer over a network. Additional well-known deployment and installation methods may be employed as well, such as, computer readable media, such as, USB thumb drives, memory cards, or the like.

At block 706, in at least one of the various embodiments, after being deployed to the target computer, the application may be executed, performing the actions and/or operations of the application. In at least one of the various embodiments, the application may be executed as directed by a user. Or, in at least one of the various embodiments, the application may be installed and configured to automatically execute at determined/configured time periods (e.g., execute at computer boot/startup, or the like).

At decision block 708, in at least one of the various embodiments, if the machine code for the compiled application includes generic object code, as such code is encountered during execution of the application control may flow to block 710; otherwise, control may flow to decision block 712. If the generic object interacts with native objects executing in the native runtime environment binding code in the binding layer may be invoked to execute the generic object code.

At block 710, in at least one of the various embodiments, the specific actions for the encountered generic object code may be executed on the target computer. In at least one of the various embodiments, to execute the generic function, the compiled application may include one or more specific pre-compiled machine code versions of the generic object code and associated binding code targeted for one or more different generic types, one of which may be for the encountered generic object code. Next, control may flow to decision block 712.

At block 712, in at least one of the various embodiments, if the applications ends, or is otherwise terminated, control may be returned to a calling process; otherwise, control may loop back to block 708 for continued execution of the application.

Figure 8:
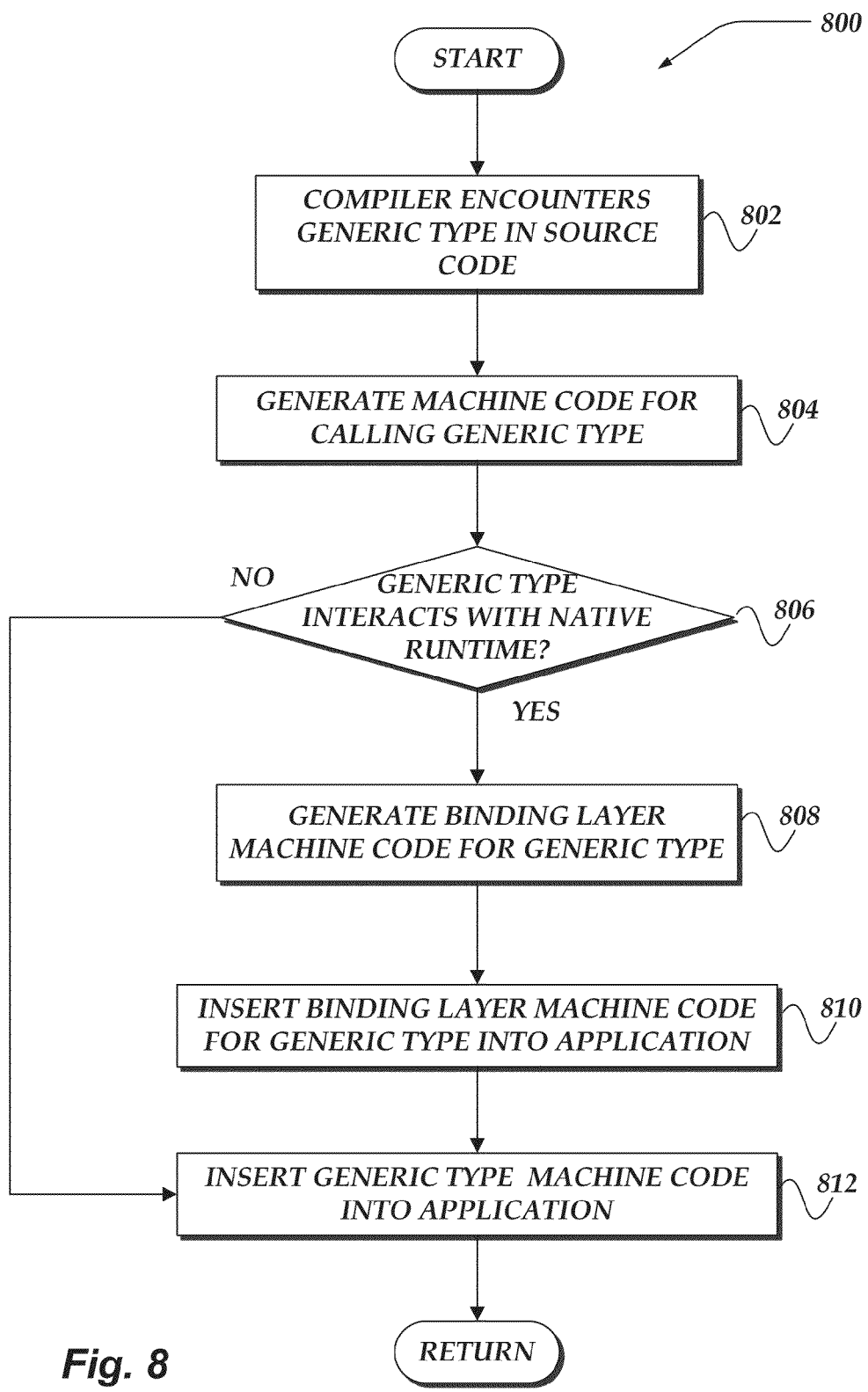
FIG. 8 shows an overview flowchart for a process for compilation of a generic type that may be encountered in the source code for a managed application in accordance with at least one of the various embodiments.

FIG. 8 shows an overview flowchart for process 800 for compilation of a generic type that may be encountered in the source code for a managed application in accordance with at least one of the various embodiments. After a start block, at block 802, in at least one of the various embodiments, during compilation the compiler may encounter a generic type in the source code of the managed application.

In at least one of the various embodiments, encountering a generic type in this context, implies that an application developer has provided source code that may generate a closed generic type based on an open generic type. For example, the application development environment of a managed runtime environment may define an open generic type such as, List<T>. In this example, if the source code defines a closed type, using code such as, var list_of_longs=List<long>, the closed generic type, List<long>, may be considered to be part of the application.

At block 804, in at least one of the various embodiments, the compiler may generate machine code based on the generic type. In at least one of the various embodiments, for each encountered generic type the compiler may take additional steps and/or generate additional machine code to handle each generic type.

At decision block 806, in at least one of the various embodiments, if the compiler determines that the encountered generic type may interact with the native runtime environment, control may flow to block 808; otherwise, control may flow to block 812. In at least one of the various embodiments, the compiler may determine if the generic type interacts with the native runtime environment based on the objects, methods, and/or method parameters that comprise the generic type. For example, if a method parameter of the generic type includes a managed peer object that corresponds to native object, the generic type may be determined to interact with the native runtime. Likewise, for example, if the generic type derives from one or more native object types, the generic type may be considered to interact with the native runtime environment.

At block 808, in at least one of the various embodiments, the compiler may generate binding layer machine code, including binding code, for the generic type. In at least one of the various embodiments, specific machine code may be generated to enable the managed application and/or the managed runtime to safely and correctly interact with the native runtime, This machine code may include argument/parameter conversion, machine code for executing the native call(s), machine code to map a managed object/call to a native object/call, machine code for mapping managed object instances to native object instances, or the like, or combination thereof.

Accordingly, the compiler may be arranged to generate machine code that conforms to the requirements of the particular native runtime environment that may be hosting the managed runtime.

At block 810, in at least one of the various embodiments, the compiler may insert the binding layer code and/or binding code that was generated for the generic type into the machine code for the application. In at least one of the various embodiments, the binding layer may be combination of machine code for the managed runtime and/or native runtime code. In at least one of the various embodiments, the particular combination may vary depending on the requirements and/or published interfaces of the native runtime.

At block 812, in at least one of the various embodiments, the compiler may insert other machine code related to the generic type into the machine code for the application. In at least one of the various embodiments, generated binding layer may be included in the machine code of the application. Accordingly, in at least one of the various embodiments, if the application may be deployed to a target computer, the binding layer machine code of the application may be deployed as well. Next, control may be returned to a calling process.

Figure 9:
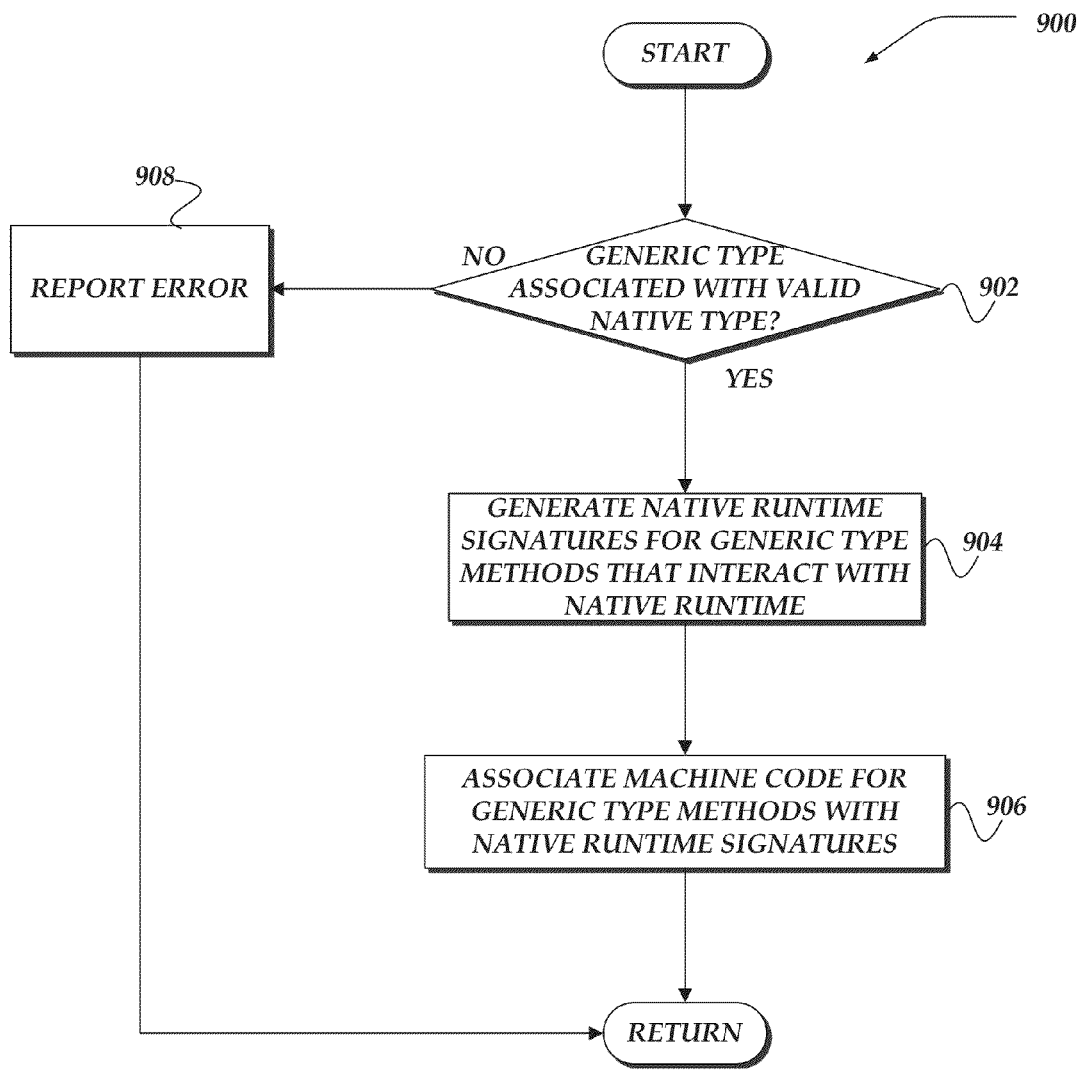
FIG. 9 shows an overview flowchart for a process for generating binding layer code for a generic type that may be encountered in the source code for a managed application in accordance with at least one of the various embodiments.

FIG. 9 shows an overview flowchart for process 900 for generating binding layer code for a generic type that may be encountered in the source code for a managed application in accordance with at least one of the various embodiments. After a start block, at decision block 902, in at least one of the various embodiments, if the generic type is valid and is associated with a supported native object type, control may flow to block 904; otherwise, control may flow to block 908. In at least one of the various embodiments, there may be some native object types that are incompatible with the managed generic type. Also, in at least one of the various embodiments, the native object type associated with the generic type method call may be incompatible with the native object type that may be required for the native method/call that corresponds to the generic type method. Accordingly, such calls may be barred by the compiler.

At block 904, in at least one of the various embodiments, the compiler may generate native runtime signature information for each generic type method that interacts with the native runtime environment. In at least one of the various embodiments, the signature information may include a native runtime function/method name, native type parameters, native type return values, or the like, combination thereof. In at least one of the various embodiments, the signature information may be stored in data structure, such as a table to enable the native runtime signature information to be associated with the appropriate managed generic type and/or generic type methods.

In at least one of the various embodiments, the mapping between native runtime methods and managed runtime methods may be predefined, such as mapping to one or more well-known published APIs or services of the native runtime. In at least one of the various embodiments, the predefined mappings may be included as features/facilities of the manage runtime and/or the managed runtime application development environment. For example, the class libraries and object definitions for a native runtime's user-interface components may be well-known and published. Accordingly, the managed runtime may include predefined mappings to map one or more of these native objects and/or native object methods to managed object/methods.

In other cases, application developers may provide the necessary meta-data to enable the mapping of managed objects types including generic object types to be performed at compile time.

At block 906, in at least one of the various embodiments, the compiler may generate binding code that associates the machine code of the generic type methods to the native runtime signature information. Next, control may be returned to a calling process. In at least one of the various embodiments, binding code may be the glue code included in the binding layer that enables the interoperability between the managed runtime and native runtime.

At block 908, in at least one of the various embodiments, since the generic type, as encountered by the compiler is not valid, an error may be reported before returning control to a calling process. In at least one of the various embodiments, such compile time errors may prevent the compiler from generating the application until the errors have been resolved.

Figure 10:
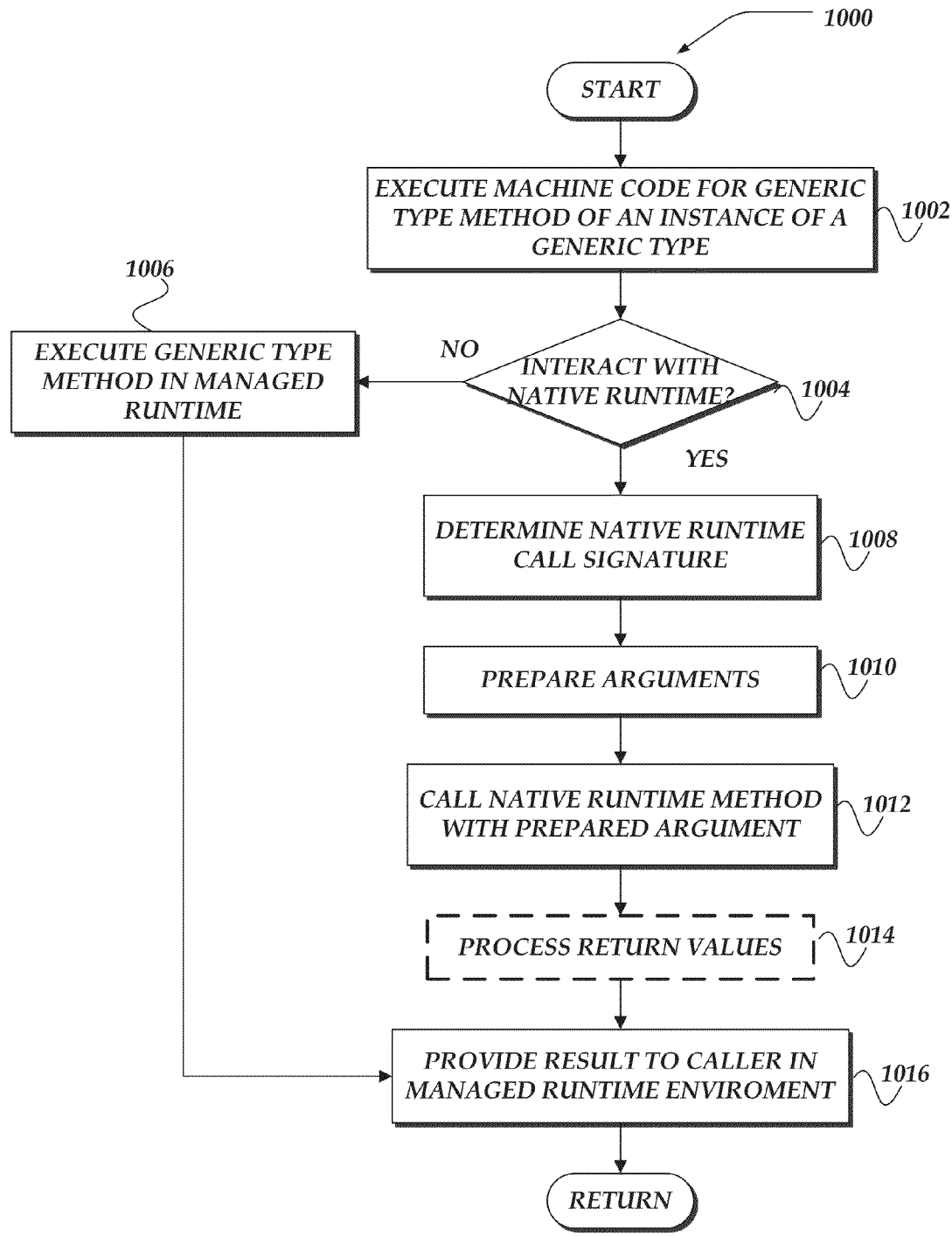
FIG. 10 shows an overview flowchart for a process for executing a managed application that may include generic types in accordance with at least one of the various embodiments.

FIG. 10 shows an overview flowchart for process 1000 for executing a managed application that may include generic types in accordance with at least one of the various embodiments. After a start block, at block 1002, in at least one of the various embodiments, the machine code for the managed application may be executing on a target computer and it may execute machine code for a generic type method for a generic object that is an instance of a generic type. In at least one of the various embodiments, during the normal execution of the managed application, machine code associated with one or more generic types may be encountered and prepared for execution.

At decision block 1004, in at least one of the various embodiments, if the machine code for the generic type method interacts with the native runtime environment, control may flow to block 1008; otherwise, control may flow to block 1006. In at least one of the various embodiments, generic type methods that may include parameter types associated with one or more native objects may be identified as having interactions with the native runtime environment. Also, in at least one of the various embodiments, generic type methods that are part of a generic type that inherits from a native object type may be identified as interacting with the native runtime. Note, in at least one of the various embodiments, generic types that may be related to native object types, may include methods and properties that do not interact with the native runtime. In at least one of the various embodiments, if methods or properties unrelated to the native runtime environment are executed/accessed they might not produce interactions with the native runtime.

At block 1006, in at least one of the various embodiments, since the generic type is not associated with native code, it may be executed in the managed runtime without additional interaction with the binding layer. Next, control may be returned to calling process to enable the application to continue executing.

At block 1008, in at least one of the various embodiments, the managed runtime may determine the native runtime call/method signature corresponding to the called generic type method. In at least one of the various embodiments, the particular generic type method may be associated with a particular native runtime call using a data structure such as a table that maps a particular manage runtime call to a native runtime call. Further, in at least one of the various embodiments, the managed runtime may confirm that required arguments are provided with managed call to support it being mapped to a the designated native runtime call/method.

At block 1010, in at least one of the various embodiments, the managed runtime may prepare the arguments, if any, that may be passed to the native runtime. In at least one of the various embodiments, arguments included with the managed runtime call may be converted as necessary to match the arguments expected by the native runtime call. In at least one of the various embodiments, an error may be generated and/or the managed application may be terminated, if the provided arguments may not be converted successfully.

At block 1012, in at least one of the various embodiments, the managed runtime may call the native runtime method using the native runtime signature, the prepared arguments and the instance identifier for the generic object. In at least one of the various embodiments, the particular mechanism for executing a native call may vary depending on the native runtime. For example, in at least one of the various embodiments, the managed runtime may have an API that enables native functions/methods to be called. Likewise, the native runtime may define API's that enable applications, such as a managed runtime, to manually call native functions/methods.

In at least one of the various embodiments, the managed runtime may convert and/or map an instance identifier associated with the managed object instance that is making the call and provide it to the native runtime call as parameter that is compatible with the native runtime.

At block 1014, optionally, in at least one of the various embodiments, the managed runtime may process the return values, if any, the may be provided by the native runtime. In at least one of the various embodiments, if the native call/methods is arranged to provide return values, the managed runtime may receive them and convert to a format that may be compatible/expected by the managed runtime method that made the call in the first place. This block may be optional to support cases where the native call may not provide return values.

At block 1016, in at least one of the various embodiments, the binding layer may provide the results of the call to the managed generic type method to the managed application that may be executing in the managed runtime environment. Next, control may be returned to a calling process.

Figure 11:
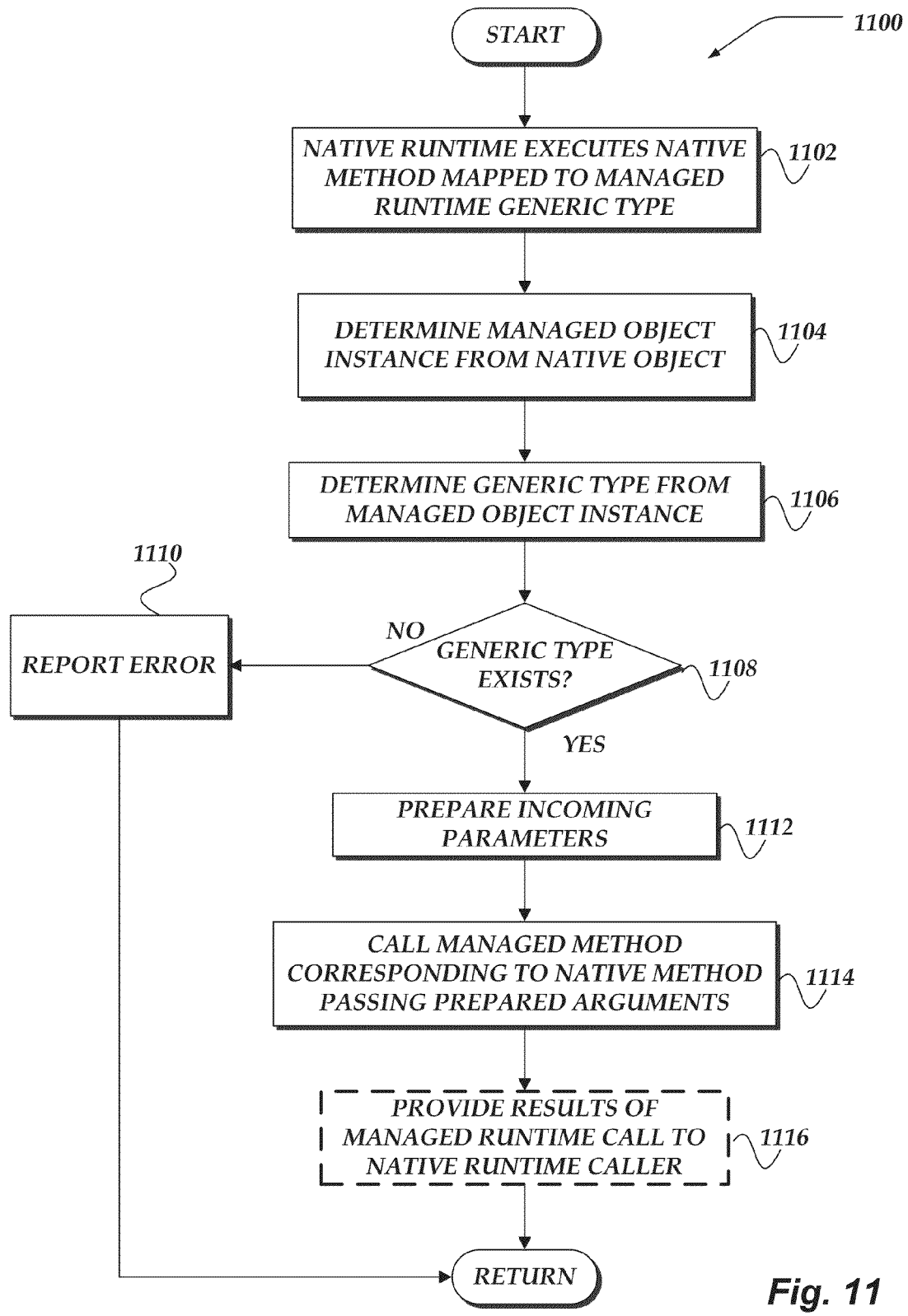
FIG. 11 shows an overview flowchart for a process that may be arranged to handle a call from the native runtime that may be mapped to a generic type method in accordance with at least one of the various embodiments.

FIG. 11 shows an overview flowchart for process 1100 that may be arranged to handle a call from the native runtime that may be mapped to a generic type method in accordance with at least one of the various embodiments. After a start block, at block 1102, in at least one of the various embodiments, the native runtime environment may execute a native method that may be mapped or associated with a managed runtime generic type.

At block 1104, in at least one of the various embodiments, the managed runtime may determine the managed object instance corresponding to the native object that is associated with the call. In at least one of the various embodiments, the arguments included in the native function call to the managed runtime may include an instance identifier, such as, a pointer or reference that may be used to identify the native object. Accordingly, the binding layer of the managed runtime may be arranged to determine the managed object instance that corresponds to the native object instance that is associated with the call from the native runtime.

In at least one of the various embodiments, the binding layer of the managed runtime may be arranged to maintain a table or other data structure that may associate the managed object instance identifier with its native object peer identifier. Accordingly, the identifier (e.g., a pointer or reference) provided in the native call may be used to lookup the managed object instance that corresponds the native object instance (e.g., the managed peer/native peer pairing).

At block 1106, in at least one of the various embodiments, the managed runtime may determine the generic type from the managed object instance that may be associated with the native object method that was called by the native runtime.

In at least one of the various embodiments, the managed runtime may be arranged include reflection features that enable the manage runtime and/or managed applications to determine the type information corresponding to a managed object instance. In at least one of the various embodiments, the managed runtime may use this type information to determine the generic type of the managed object.

Further, in at least one of the various embodiments, in addition to the type information of the managed object instance, the managed runtime may confirm that the function name and number of arguments match a generic type method. In at least one of the various embodiments, the managed runtime may include a mapping between the native runtime method identifier/name and the managed runtime version of the method. In at least one of the various embodiments, this mapping may include parameter information as well that may be used to ensure the native runtime method call correctly corresponds to it peer call/method in the managed runtime.

At decision block 1108, if the generic type is known to the managed runtime, control may flow to block 1108; otherwise, control may flow to block 1110. In at least one of the various embodiments, if the binding layer is unable to determine the managed object instance from the information in the native runtime call, an error may be generated. In at least one of the various embodiments, in cases, where the managed object instance may be determined but a corresponding generic type is not found may also result in an error condition.

In at least one of the various embodiments, the compiler may be arranged to identify one or more source code patterns that may introduce this error condition and present them a programming errors before the application may be executed. However, if the compiler did not or could not prevent such errors from occurring they may be caught by process 1100.

At block 1110, in at least one of the various embodiments, the managed runtime may generate an error report that indicates at least that the native object and/or native object method that was call in not associated with a managed runtime generic type. Next, control may be returned to a calling process. In at least one of the various embodiments, the error report may include generating an exception event that causes the application to terminate.

At block 1112, in at least one of the various embodiments, the managed runtime may process one or more arguments, if any, that may be provided by the native runtime environment with the native object method call. In at least one of the various embodiments, the binding layer may be arranged to take actions that may be necessary to conform the arguments provided in the native method call. In some cases, this may include accommodating byte order differences that may exist between the managed runtime and native runtime.

In at least one of the various embodiments, the contents of the native runtime arguments may be converted to parameter types that may be supported and/or preferred by the managed runtime. In at least one of the various embodiments, the generic type method that corresponds to the native method call may determine how the native parameters may be converted. For example, if a native call provide a vector value represented as three separate parameters while the managed object method accepts a single reference to a Vector3D object, the binding layer may be allocated a new Vector3D object using the three values and use the object as parameter for the managed object call. Other conversions may be performed, such as, converting from native representations/objects to managed objects, or the like.

At block 1114, in at least one of the various embodiments, the managed runtime may call the managed object method that corresponds to the native object method and pass any prepared arguments as parameters. In at least one of the various embodiments, at this point the managed runtime has identified the managed object instance corresponding to the native runtime call, and the incoming parameters, if any, have been modified to accommodate the managed runtime's requirements, if any. Accordingly the bind layer may execute the managed method call such that its corresponding action may be performed in the manage runtime.

At block 1116, optionally, in at least one of the various embodiments, the managed runtime may provide the results of the call to the managed object method to the native runtime caller. This block may be optional since sometimes the calls may not provide return values. In at least one of the various embodiments, managed method calls that are expected and/or required to return values to the native runtime may be received and processed. In at least one of the various embodiments, processing may include one or more data conversion actions to present the return value in a format expected by the native runtime. Next, the control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for generating an application using a computer that performs actions, including:
    when a generic type is encountered during compilation of a source code version of the application into a machine code version of the application, further actions are performed, including:
        when the encountered generic type has one or more interactions with a native runtime environment, performing further actions, comprising:
            determining one or more generic type methods of the encountered generic type that interact with the native runtime environment;
            generating native runtime signatures for each of the determined generic type methods, wherein the native runtime signatures enable one or more native objects in the native runtime environment to execute the generic type methods in the managed runtime environment;
            generating binding layer machine code, wherein the binding layer machine code maps each native runtime signature to its correspondent generic type method; and
            inserting the binding layer machine code into the machine code version of the application; and
        when a native object in the native runtime environment calls a generic object method in the managed runtime environment, performing actions, comprising:
            determining an identifier of a managed object that corresponds to the generic object method, wherein the identifier is provided by the native runtime environment; and
            determining a generic type that defines one or more actions of the generic object method based on the managed object that corresponds to the identifier.

2. The method of claim 1, wherein the one or more interactions with the native runtime environment, further comprises, determining one or more features of a native object type that are inherited by the encountered generic type.

3. The method of claim 1, wherein the one or more interactions with the native runtime environment, further comprises, determining one or more of, one or more generic type methods that include parameters that are native object types, or one or more generic type methods that return values that are native object types.

4. The method of claim 1, wherein the one or more interactions with the native runtime environment, include, one or more of, communicating user input, displaying user interfaces, network communication, file system access, or audio generation.

5. The method of claim 1, wherein generating the native runtime signatures, further comprises, generating native runtime signature information that includes at least binding layer machine code to convert one or more managed parameter types to one or more native parameter types.

6. The method of claim 1, wherein generating the binding layer machine code further comprises, generating machine code that enables one or more managed generic type objects to execute one or more native object methods in the native runtime environment.

7. The method claim 1, further comprising, determining that the interactions with the native runtime environment are compatible with the encountered generic type based on one or more native objects that are referenced by the encountered generic type.

8. A system for generating an application, comprising:
    a computer, including:
        a transceiver that communicates over the network;
        a memory that stores at least instructions; and
        a processor device that is executes instructions that enable actions, including:
            when a generic type is encountered during compilation of a source code version of the application into a machine code version of the application, further actions are performed, including:
                when the encountered generic type has one or more interactions with a native runtime environment, performing further actions, comprising:
                    determining one or more generic type methods of the encountered generic type that interact with the native runtime environment;
                    generating native runtime signatures for each of the determined generic type methods, wherein the native runtime signatures enable one or more native objects in the native runtime environment to execute the generic type methods in the managed runtime environment;
                    generating binding layer machine code, wherein the binding layer machine code maps each native runtime signature to its correspondent generic type method; and
                    inserting the binding layer machine code into the machine code version of the application; and
    a target computer, including:
        a transceiver for communicating over the network;
        a memory for storing at least instructions; and
        a processor device that is operative to execute instructions that enable actions, including:
            executing the machine code version of the application; and
            when a native object in the native runtime environment calls a generic object method in the managed runtime environment, performing actions, comprising:
                determining an identifier of a managed object that corresponds to the generic object method, wherein the identifier is provided by the native runtime environment; and determining a generic type that defines one or more actions of the generic object method based on the managed object that corresponds to the identifier.

9. The system of claim 8, wherein the one or more interactions with the native runtime environment, further comprises, determining one or more features of a native object type that are inherited by the encountered generic type.

10. The system of claim 8, wherein the one or more interactions with the native runtime environment, further comprises, determining one or more of, one or more generic type methods that include parameters that are native object types, or one or more generic type methods that return values that are native object types.

11. The system of claim 8, wherein the one or more interactions with the native runtime environment, include, one or more of, communicating user input, displaying user interfaces, network communication, file system access, or audio generation.

12. The system of claim 8, wherein generating the native runtime signatures, further comprises, generating native runtime signature information that includes at least binding layer machine code to convert one or more managed parameter types to one or more native parameter types.

13. The system of claim 8, wherein generating the binding layer machine code further comprises, generating machine code that enables one or more managed generic type objects to execute one or more native object methods in the native runtime environment.

14. The system of claim 8, wherein the computer processor device enables further actions comprising, determining that the interactions with the native runtime environment are compatible with the encountered generic type based on one or more native objects that are referenced by the encountered generic type.

15. A network computer for generating an application, comprising:
  a transceiver that communicates over the network;
  a memory that stores at least instructions; and
  a processor device that executes instructions that enable actions, including:
    when a generic type is encountered during compilation of a source code version of the application into a machine code version of the application, further actions are performed, including:
      when the encountered generic type has one or more interactions with a native runtime environment, performing further actions, comprising:
        determining one or more generic type methods of the encountered generic type that interact with the native runtime environment;
        generating native runtime signatures for each of the determined generic type methods, wherein the native runtime signatures enable one or more native objects in the native runtime environment to execute the generic type methods in the managed runtime environment;
        generating binding layer machine code, wherein the binding layer machine code maps each native runtime signature to its correspondent generic type method; and
        inserting the binding layer machine code into the machine code version of the application; and
      when a native object in the native runtime environment calls a generic object method in the managed runtime environment, performing actions, comprising:
        determining an identifier of a managed object that corresponds to the generic object method, wherein the identifier is provided by the native runtime environment; and
        determining a generic type that defines one or more actions of the generic object method based on the managed object that corresponds to the identifier.

16. The network computer of claim 15, wherein the one or more interactions with the native runtime environment, further comprises, determining one or more features of a native object type that are inherited by the encountered generic type.

17. The network computer of claim 15, wherein the one or more interactions with the native runtime environment, further comprises, determining one or more of, one or more generic type methods that include parameters that are native object types, or one or more generic type methods that return values that are native object types.

18. The network computer of claim 15, wherein the one or more interactions with the native runtime environment, include, one or more of, communicating user input, displaying user interfaces, network communication, file system access, or audio generation.

19. The network computer of claim 15, wherein generating the native runtime signatures, further comprises, generating native runtime signature information that includes at least binding layer machine code to convert one or more managed parameter types to one or more native parameter types.

20. The network computer of claim 15, wherein the processor device enables further actions comprising, determining that the interactions with the native runtime environment are compatible with the encountered generic type based on one or more native objects that are referenced by the encountered generic type.

21. The network computer of claim 15, wherein generating the binding layer machine code further comprises, generating machine code that enables one or more managed generic type objects to execute one or more native object methods in the native runtime environment.

22. A processor readable non-transitive storage media that includes instructions for generating an application, wherein a computer that executes at least a portion of the instructions is enabled to perform actions, comprising:
  when a generic type is encountered during compilation of a source code version of the application into a machine code version of the application, further actions are performed, including:
    when the encountered generic type has one or more interactions with a native runtime environment, performing further actions, comprising:
      determining one or more generic type methods of the encountered generic type that interact with the native runtime environment;
      generating native runtime signatures for each of the determined generic type methods, wherein the native runtime signatures enable one or more native objects in the native runtime environment to execute the generic type methods in the managed runtime environment; generating binding layer machine code, wherein the binding layer machine code maps each native runtime signature to its correspondent generic type method; and
      inserting the binding layer machine code into the machine code version of the application; and
    when a native object in the native runtime environment calls a generic object method in the managed runtime environment, performing actions, comprising:

determining an identifier of a managed object that corresponds to the generic object method, wherein the identifier is provided by the native runtime environment; and determining a generic type that defines one or more actions of the generic object method based on the managed object that corresponds to the identifier.

23. The media of claim 22, wherein the one or more interactions with the native runtime environment, further comprises, determining one or more features of a native object type that are inherited by the encountered generic type.

24. The media of claim 22, wherein the one or more interactions with the native runtime environment, further comprises, determining one or more of, one or more generic type methods that include parameters that are native object types, or one or more generic type methods that return values that are native object types.

25. The media of claim 22, wherein the one or more interactions with the native runtime environment, include, one or more of, communicating user input, displaying user interfaces, network communication, file system access, or audio generation.

26. The media of claim 22, wherein generating the native runtime signatures, further comprises, generating native runtime signature information that includes at least binding layer machine code to convert one or more managed parameter types to one or more native parameter types.

27. The media of claim 22, wherein generating the binding layer machine code further comprises, generating machine code that enables one or more managed generic type objects to execute one or more native object methods in the native runtime environment.

* * * * *

UNITED STATES PATENT AND TRADEMARK OFFICE
CERTIFICATE OF CORRECTION

PATENT NO. : 9,201,637 B1
APPLICATION NO. : 14/670218
DATED : December 1, 2015
INVENTOR(S) : Kvinge et al.

Page 1 of 1

It is certified that error appears in the above-identified patent and that said Letters Patent is hereby corrected as shown below:

In the specification

Column 2, Line 54, delete "art the" and insert -- the art --, therefor.

Column 17, Line 36, delete "generic type 602" and insert -- generic type 604 --, therefor.

Column 17, Line 39, delete "generic type 606" and insert -- generic type 604 --, therefor.

Column 17, Line 46, delete "generic type 602" and insert -- generic type 604 --, therefor.

Column 18, Line 1, delete "generic type 606." and insert -- generic type 604. --, therefor.

Column 22, Line 55, delete "the may" and insert -- that may --, therefor.

In the claims

Column 26, Line 20, in Claim 7, delete "method" and insert -- method of --, therefor.

Signed and Sealed this
Nineteenth Day of April, 2016

Michelle K. Lee
*Director of the United States Patent and Trademark Office*